United States Patent [19]
Matsubara et al.

[11] Patent Number: 6,147,845
[45] Date of Patent: Nov. 14, 2000

[54] SYSTEM INTERCONNECTION DEVICE AND METHOD OF DESIGNING SAME

[75] Inventors: Yoshio Matsubara; Masakuni Asano; Noriaki Tokuda, all of Kyoto, Japan

[73] Assignee: Nissin Electric Co., Ltd., Kyoto, Japan

[21] Appl. No.: 09/287,979

[22] Filed: Apr. 7, 1999

[30] Foreign Application Priority Data

Apr. 8, 1998 [JP] Japan ................... 10-096343

[51] Int. Cl.⁷ .................................................. H02H 9/00
[52] U.S. Cl. ......................... 361/58; 361/62; 361/93.9; 307/86
[58] Field of Search .................. 361/58, 62–63, 361/65, 93.1, 93.9; 307/71, 85–86

[56] References Cited

U.S. PATENT DOCUMENTS

| | | | |
|---|---|---|---|
| 4,438,474 | 3/1984 | Paice | 361/58 |
| 4,539,617 | 9/1985 | Delaney et al. | 361/58 |
| 4,642,747 | 2/1987 | Cho | 363/54 |
| 4,771,229 | 9/1988 | Ziegler | 323/909 |

FOREIGN PATENT DOCUMENTS

| | | |
|---|---|---|
| 50/59762 | 5/1975 | Japan . |
| 51/48138 | 4/1976 | Japan . |
| 9/285012 | 10/1997 | Japan . |
| WO99/09631 | 2/1999 | WIPO . |

*Primary Examiner*—Michael J. Sherry
*Attorney, Agent, or Firm*—Dike, Bronstein, Roberts & Cushman, LLP; David G. Conlin

[57] ABSTRACT

A system interconnection device connected between two systems, such as a commercial bus line carrying power from a commercial power line and a private bus line carrying power from a private power generator, is able to connect and disconnect the two systems, and, in the event of a fault, has a current-limiting effect, thus preventing instantaneous voltage drop of the respective bus lines. In the system interconnection device, unit parallel circuits made up of diodes and DC reactors are serially connected so that the diodes thereof have opposite directions. With this structure, in realizing operations equivalent to those of a conventional system interconnection device having a DC reactor between DC terminals of a single-phase rectifying bridge circuit, the number of diodes, which are rectifying elements, can be halved. This not only enables reduction of the total cost of elements, but also, particularly in high-voltage and extra-high-voltage systems, enables great reduction of the cost and space devoted to insulation.

4 Claims, 12 Drawing Sheets

OFF

SYSTEM INTERCONNECTION DEVICE AND METHOD OF DESIGNING SAME

FIELD OF THE INVENTION

The present invention relates to a system interconnecting device, used to interconnect two electrical systems, such as two electrical power systems each having one or more power generators and a plurality of loads (such as a commercial power system and a private power generating system), or an electrical power system having a power source and a load system, and relates to a method of designing such a system interconnecting device.

BACKGROUND OF THE INVENTION

In connecting two electrical power systems by means of a conventional structure which uses only a circuit-breaker, excessive current resulting from a fault continues to flow until the fault is detected and the circuit-breaker operates. In order to resolve this problem, in Japanese Unexamined Patent Publication 9-285012/1997 (Tokukaihei 9-285012), the present Applicant proposed a structure for a system interconnection device capable of suppressing this kind of excessive current.

Figure 12:
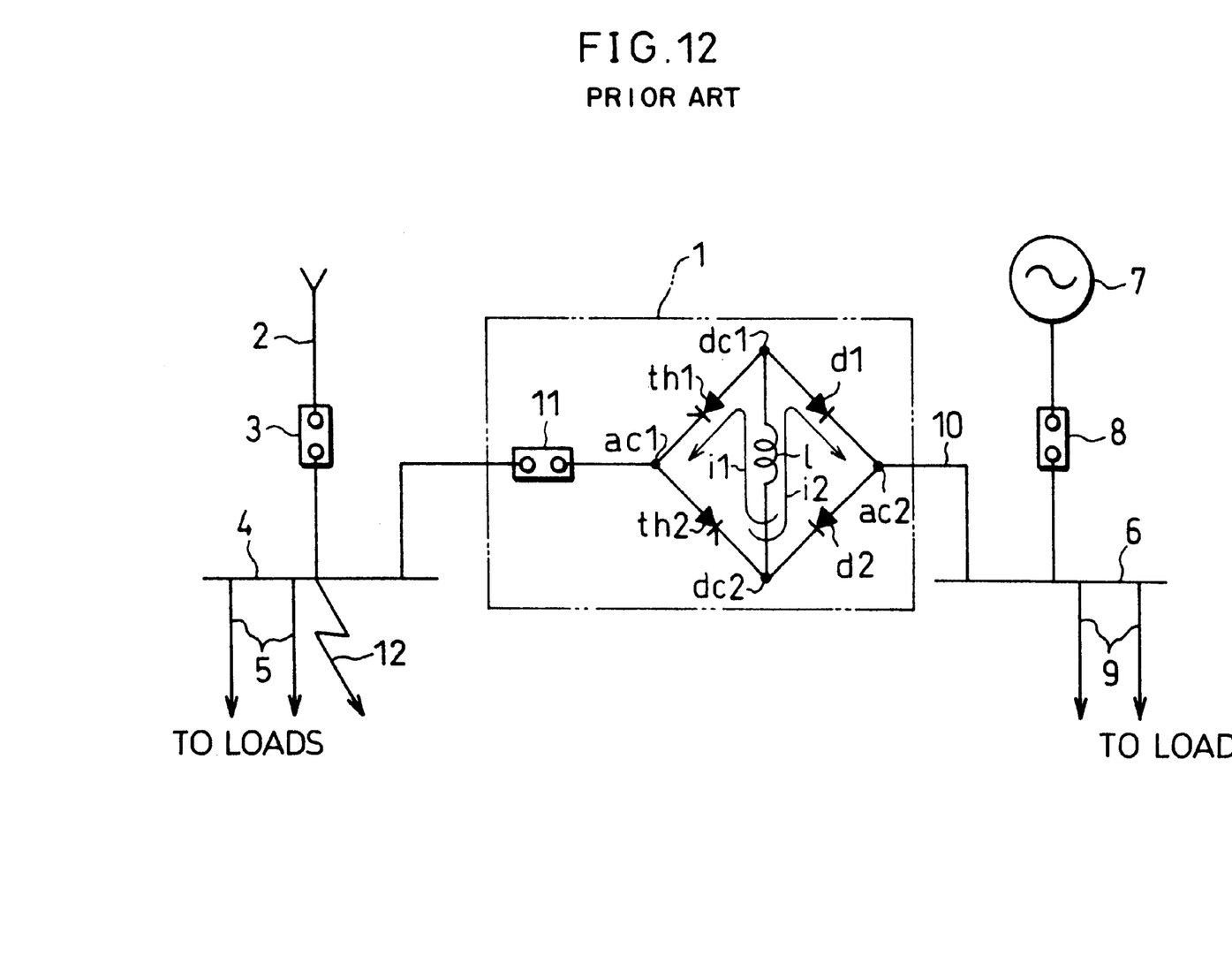
FIG. 12 is a drawing explaining a typical conventional system interconnection device.

FIG. 12 is a drawing explaining a structure for connecting a commercial power system and a private generating system using a system interconnection device 1 according to Japanese Unexamined Patent Publication 9-285012/1997 above, which is a typical example of conventional art. The system interconnection device 1 is made up of a single-phase rectifying bridge circuit and a direct current (DC) reactor, and is installed at the point of connection between two systems, and realizes prompt suppression of voltage drop due to parallel off or fault.

In FIG. 12, in the commercial power system, a commercial power line 2 supplying a private establishment is connected to a commercial bus line 4 via a circuit-breaker 3. To the commercial bus line 4 are connected a plurality of supply lines 5 for connection to typical loads. In the private generating system, on the other hand, a private power generator 7 is connected to a private bus line 6 via a circuit-breaker 8. To the private bus line 6 are connected supply lines 9 for connection to important loads amounting to, for example, 60% to 70% of the private generating capacity. The commercial bus line 4 and the private bus line 6 are interconnected by the system interconnection device 1.

The system interconnection device 1 is interposed in a bus interconnection line 10 connecting the respective bus lines 4 and 6, and includes a single-phase rectifying bridge circuit made up of a pair of thyristors th1 and th2 (which are rectifying switching elements) and a pair of diodes d1 and d2, a DC reactor 1, and a circuit-breaker 11. The pair of thyristors th1 and th2 are connected to one of two alternating current (AC) terminals ac1 and ac2 in the bus interconnection line 10, and the pair of diodes d1 and d2 are connected to the other of the AC terminals ac1 and ac2 (in the example shown in FIG. 12, the thyristors th1 and th2 are connected to the AC terminal ac1, and the diodes d1 and d2 to the AC terminal ac2). The DC reactor 1, on the other hand, is connected between two DC terminals dc1 and dc2.

The foregoing single-phase rectifying bridge circuit may be made up of only diodes, or of only thyristors. However, if there is a thyristor in at least one arm (connected to one of the AC terminals ac1 and ac2), the circuit-breaker 11 may be omitted.

In the system interconnection device 1 structured as above, during normal operation, the gates of the thyristors th1 and th2 are driven so that the thyristors th1 and th2 conduct current, and current flows either in the direction indicated by reference symbol i1 or the direction indicated by reference symbol i2. Accordingly, setting a current attenuation time constant of the DC reactor 1 to a value not less than 2.5 times the system frequency cycle causes a current $i_{usu}$ flowing through the DC reactor 1 to be direct current of a substantially fixed level, and a voltage across the terminals of the DC reactor 1 is 0 ($V_{DCL}=l(di_{usu}/dt)=0$).

In contrast, when there is, for example, a fault in the commercial bus line 4, as indicated by reference numeral 12, and an excessive current $i_{fault}$ flows from the private bus line 6 to the commercial bus line 4, as soon as a value of the excessive current $i_{fault}$ exceeds the level of the direct current $i_{usu}$ which had been flowing through the DC reactor 1 up to that point, the current $i_{fault}$ which attempts to charge the DC reactor 1 flows into the DC reactor 1, and a voltage proportional to a differential value of the excessive current $i_{fault}$ is produced across the terminals of the DC reactor 1 ($V_{DCL}=l(di_{fault}/dt)$).

For this reason, a voltage equal to the voltage $V_{DCL}$ across the terminals of the DC reactor 1 is produced across the AC terminals ac1 and ac2. In other words, an apparent impedance arises across the AC terminals ac1 and ac2, and a current-limiting effect can be realized which suppresses the current attempting to flow from the private bus line 6 to the commercial bus line 4 through the bus interconnection line 10. While this current-limiting effect operates, the gates of the thyristors th1 and th2 are blocked by an output from a ground or short-circuit protective relay (not shown), or the circuit-breaker 11 is opened, and the private bus line 6 is cut off from the commercial bus line 4 rapidly and with certainty, thus suppressing an instantaneous voltage drop caused by excessive load on the private power generator 7.

The foregoing conventional system interconnection device 1 is highly effective in suppressing instantaneous voltage drop in the bus line which is not faulty, but the rectifying elements account for a disproportionate share of cost and space in the device. In particular, when the insulating level is high, as with special high-voltage and high-voltage systems, it becomes necessary to stack rectifying elements in tower form in each of the four arms of each phase, and not only are the rectifying elements themselves expensive, but structures for insulation are also costly and take up space.

Figure 13:
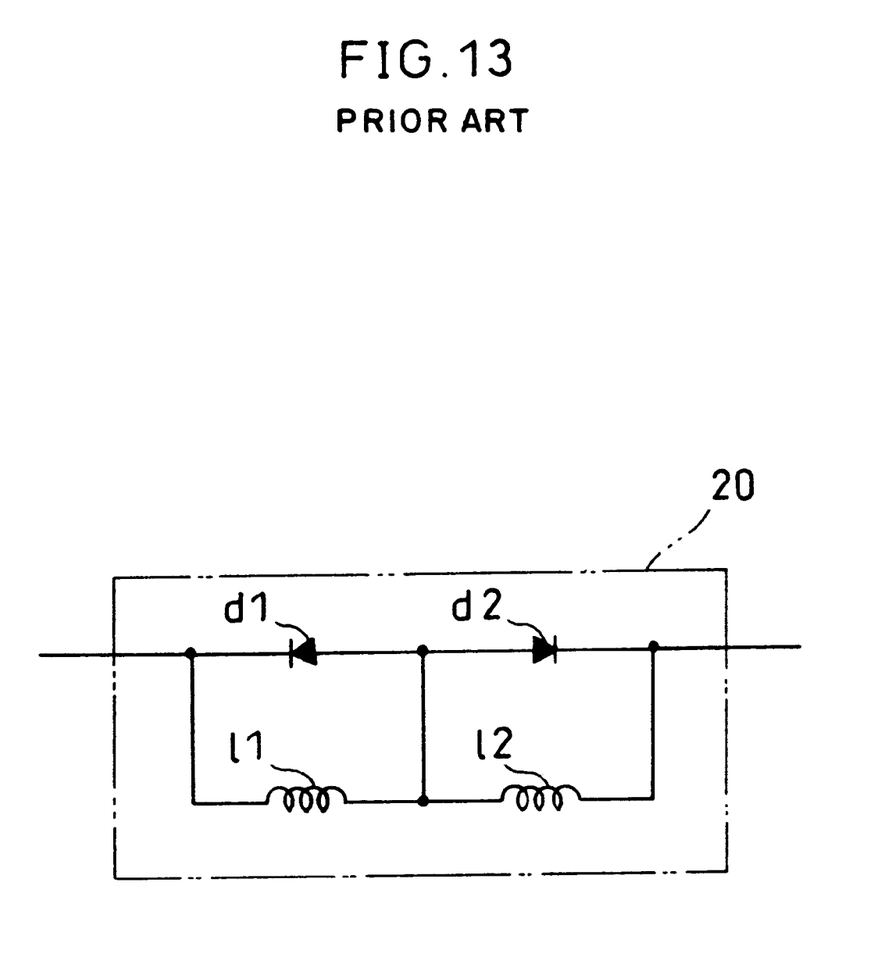
FIG. 13 is a drawing explaining a conventional AC current-limiting device.

In contrast, Japanese Unexamined Patent Publication 50-59762/1975 (Tokukaisho 50-59762) discloses an AC current-limiting device, shown in FIG. 13, which is interposed serially between two systems, and which realizes a current-limiting effect using a small number of diodes. This conventional AC current-limiting device 20 is made up of two diodes d1 and d2, connected together serially but with inverse polarity, interposed serially in an alternating-current path, and a reactor l1 connected in parallel with the diode d1, and a reactor l2, connected in parallel with the diode d2. Further, to enable the reactors l1 and l2 to realize sufficient current-limiting effect with respect to excessive current due to load fluctuation or fault, their discharge time constant is set high.

However, since the conventional AC current-limiting device 20 is not provided with any structure for cutting the respective systems off from one another, it cannot be used as a system interconnection device. Moreover, if a system interconnection device is structured by replacing the diodes d1 and d2 of the AC current-limiting device 20 with thyristors like those used in the system interconnection device 1 above, further problems arise, in that the two systems are continually connected by the reactors 11 and 12, and excessive voltage is produced by discharge of magnetic field energy by the reactors 11 and 12 when the thyristors are cut off.

Further, if a system interconnection device is structured by serially connecting a circuit-breaker with the AC current-limiting device 20, since, as mentioned above, the discharge time constant is high, an interval from cut-off of the circuit-breaker to re-connection of the two systems must be long enough to allow discharge of the magnetic field energy.

SUMMARY OF THE INVENTION

It is an object of the present invention to provide a system interconnection device capable of reducing device cost and size, and to provide a method of designing such a system interconnection device.

In order to attain the foregoing object, a system interconnection device according to the present invention, for connecting two systems, is made up of: unit parallel circuits, each including a rectifying element and a DC reactor connected in parallel; a serial circuit including a plurality of the unit parallel circuits serially connected such that total inductances of the DC reactors in positive and negative rectifying directions of the rectifying elements are substantially equal; and a circuit-breaker for connecting and disconnecting the two systems, serially connected to the serial circuit; the serial circuit and the circuit-breaker being interposed between the two systems; and a current attenuation time constant $\tau$ of the DC reactors being set according to the formula:

$$\tau \leq T_U/\ln(I_{DCMAX}/I_{DC0})$$

where $I_{DC0}$ is a current flowing through the DC reactors during normal operation; $I_{DCMAX}$ is a maximum current during a current-limiting effect; and $T_0$ is a disconnect/connect interval of the circuit-breaker, required for re-connection of the two systems.

In the foregoing structure, a rectifying element (such as a diode or a thyristor operating as a diode) and a DC reactor make up a unit parallel circuit, and two or more of the unit parallel circuits, serially connected such that respective total inductances of the DC reactor are substantially equal in positive and negative rectifying directions of the rectifying elements, make up a serial circuit. In the system interconnection device structured in this way, just as in conventional system interconnection device having a DC reactor between DC terminals of a single-phase rectifying bridge circuit, from the point of view of the AC terminals, impedance is substantially zero during normal operation, but increases when an fault occurs, thus realizing a current-limiting effect.

Accordingly, the current return loop, structured in the conventional system interconnection device by a rectifying elements and a DC reactor provided in each of two arms, can be structured by a rectifying element and a DC reactor in a single arm. Thus, although using a plurality of DC reactors to obtain an inductance equal to that of the DC reactor of the conventional structure results in a slight increase in the cost of and space devoted to DC reactors over the conventional structure, and the current capacity of the rectifying element is approximately doubled, the potential difference handled by a single rectifying element is the same as in the conventional system interconnection device. Accordingly, the number of rectifying elements required is half as many as in the conventional system interconnection device, thus reducing the total cost of the rectifying elements, and in the case of a special high-voltage or high-voltage system, the structure for insulation can be greatly reduced in size, which also contributes to reduction in cost and size of the device.

In addition, the magnetic field energy stored by the DC reactor at the time of disconnection by the circuit-breaker has, after passage of the disconnect/connect interval $T_0$ required for re-connection of the systems, attenuated to the level of the current $I_{DC0}$ during normal operation, and thus the systems can be rapidly re-connected by re-connecting the circuit-breaker.

A single serial circuit may be used, but when a large rated current is necessary, it is preferable to provide a plurality of serial circuits, mutually connected in parallel.

Whereas the rated voltage of each serial circuit is determined by the number of unit parallel circuit stages, with the foregoing structure, the rated current can be determined by the number of serial circuits. Accordingly, by increasing the number of serial circuits mutually connected in parallel, the rated current can be increased. Further, even if the structure of the unit parallel circuit is standardized, rated current and rated voltage of the system interconnection device can be set to desired values by setting the number of unit parallel circuit stages in each serial circuit and the total number of serial circuits. Thus design of the device is simplified.

When a plurality of serial circuits are provided, it is preferable to provide one or both ends of at least one of the serial circuits with an alternating-current (AC) reactor for equalizing current.

With the foregoing structure, even if unevenness among the rectifying elements gives rise to unevenness in current among the plurality of serial circuits, by using an AC reactor to adjust the current flowing through each serial circuit to a desired value, balance among the serial circuits can be attained. Accordingly, the characteristics of the respective rectifying elements need not conform with each other with high precision, and thus the total cost of the rectifying elements can be reduced, and the cost of assembly and adjustment can also be reduced.

A method of designing a system interconnection device with the foregoing structure includes the steps of; setting a standard by setting in advance rated voltage and rated current of the unit parallel circuits; setting a number of stages of unit parallel circuits to be serially connected so as to be able to handle a voltage at least as large as the rated voltage; and setting a number of the serial circuits to be connected in parallel so as to be able to handle a current at least as large as the rated current.

Conventionally, design and production of DC reactor and rectifying element units were performed separately for different specifications, which, especially with systems with a large number of serial and parallel stages of rectifying elements, complicated the design and production operations, required much effort, and increased costs. However, with the foregoing method, a system satisfying a desired rated voltage and rated current can be constructed merely by setting the number of serial and parallel stages of unit parallel circuits. Thus the effort and cost of design and production can be reduced.

Additional objects, features, and strengths of the present invention will be made clear by the description below. Further, the advantages of the present invention will be evident from the following explanation in reference to the drawings.

DESCRIPTION OF THE EMBODIMENTS
First Embodiment

The following will explain a first embodiment of the present invention with reference to FIGS. 1 through 8(c).

Figure 1:
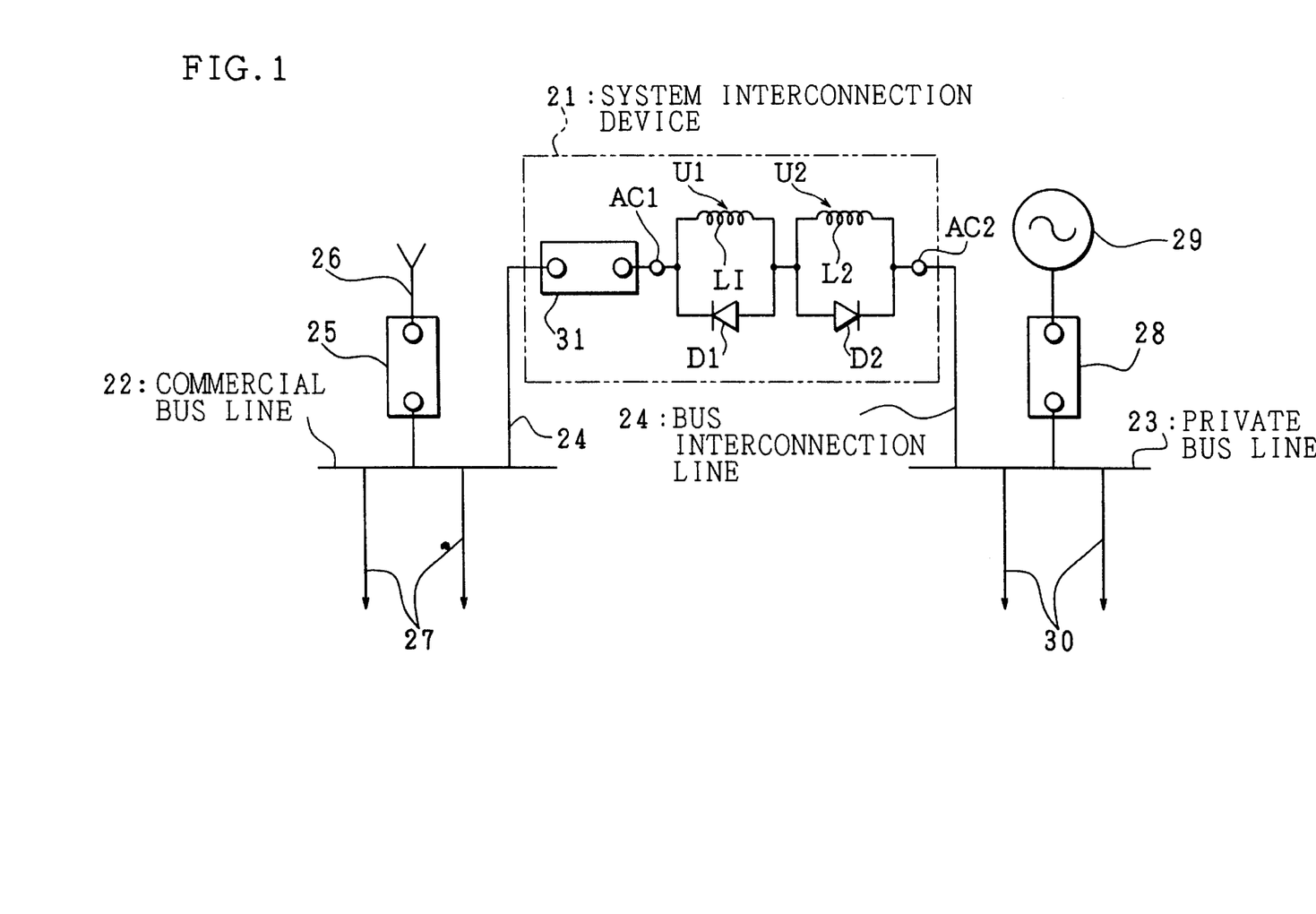
FIG. 1 is a drawing for explaining a system interconnection device according to the first embodiment of the present invention.
Figure 2:
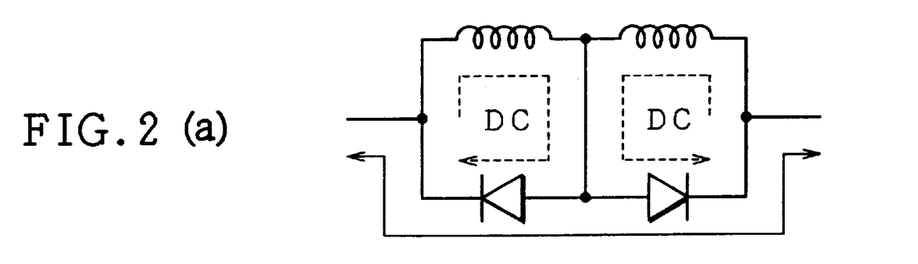
FIGS. 2(a) through 2(d) are electric circuit diagrams for explaining the operations of the system interconnection device shown in FIG. 1.
Figure 3:
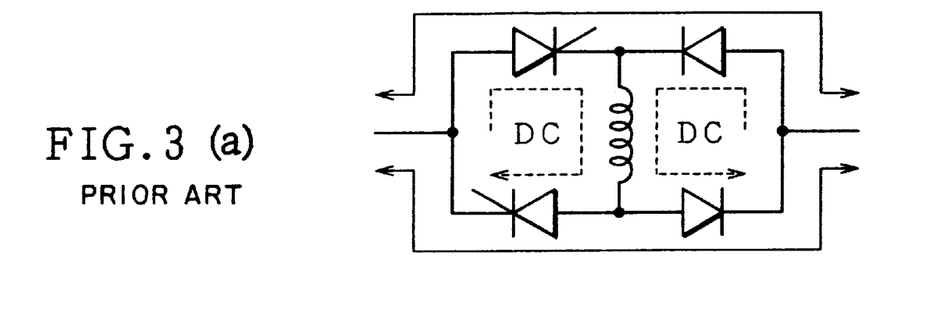
FIGS. 3(a) through 3(d) are electric circuit diagrams for explaining the operations of the conventional system interconnection device shown in FIG. 12.

FIG. 1 is a drawing explaining a system interconnection device 21 according to the present first embodiment. The system interconnection device 21 is interposed in a bus interconnection line 24 which connects a commercial bus line 22 and a private bus line 23 within a private establishment. The commercial bus line 22 is connected to a commercial power line 26 via a circuit-breaker 25, and to a plurality of supply lines 27 for connection to typical loads. Further, the private bus line 23 is connected to a private power generator 29 via a circuit breaker 28, and to supply lines 30 for connection to important loads such as a computer, etc.

The system interconnection device 21 includes a unit parallel circuit U1 made up of a DC reactor L1 and a diode D1, a unit parallel circuit U2 made up of a DC reactor L2 and a diode D2, and a circuit-breaker 31. The unit parallel circuits U1 and U2 are serially connected such that respective rectifying directions (directions of current flow) of the diodes D1 and D2 are opposite, and the ends of the serial circuit formed thereby are provided with AC terminals AC1 and AC2, respectively. The AC terminal AC2 is connected to that part of the bus interconnection line 24 which is connected to the private bus line 23, and the AC terminal AC1 is connected, via a circuit-breaker 31, to that part of the bus interconnection line 24 which is connected to the commercial bus line 22.

In the system interconnection device 21, if the rectifying direction of, for example, the diode D1 is defined as a positive direction and the rectifying direction of the diode D2 is defined as a negative direction, since each of the unit parallel circuits U1 and U2 has one serial stage in each of the positive and negative directions, the DC reactors L1 and L2 have respective inductances which are equal, each of which is one-half of that of the DC reactor 1 of the conventional system interconnection device 1 shown in FIG. 12. In other words, the DC reactors are provided such that their current attenuation time constant τ is not less than 2.5 times the system frequency cycle. Consequently, the diodes D1 and D2 are biased, even without providing a DC power source, and a voltage across the AC terminals is nearly 0 during normal operation. Further, the current capacity of each of the diodes D1 and D2 is set to twice the current capacity of each of the diodes d1 and d2 and the thyristors th1 and th2.

FIGS. 2(a) through 2(d) are electric circuit diagrams schematically showing the unit parallel circuits U1 and U2, for explaining the operations of the system interconnection device 21 structured as above, and FIGS. 3(a) through 3(d) are electric circuit diagrams schematically showing the conventional system interconnection device 1 shown in FIG. 12, for explaining the operations thereof.

In the conventional system interconnection device 1, as shown in FIG. 3(c), a current indicated by the solid arrow alternates with a current indicated by the broken arrow every half-cycle. Further, as shown in FIG. 3(a), due to direct current flowing from the DC reactor 1 through a current return loop formed by the diodes d1 and d2 or a current return loop formed by the thyristors th1 and th2, there is an apparent current, shown by the solid arrows, between the AC terminals ac1 and ac2.

Similarly, in the system interconnection device 21, as shown in FIG. 2(c), current flowing in the direction indicated by the solid arrow alternates with current flowing in the direction indicated by the broken arrow every half-cycle. Accordingly, due to direct current shown by the broken arrows in FIG. 2(a), which flows through a current return loop formed by the DC reactor L1 and the diode D1 and a current return loop formed by the DC reactor L2 and the diode D2, there is an apparent current, shown by the solid arrows, between the AC terminals AC1 and AC2, flowing on the side of the diodes D1 and D2.

For this reason, the rated current capacity of each of the diodes D1 and D2 is set to twice that of each of the diodes d1 and d2 and the thyristors th1 and th2. Further, the DC reactor 1 of the conventional system interconnection device 1 is charged by the current flow once every half-cycle, but in the system interconnection device 21, the DC reactors L1 and L2 are alternately charged each half-cycle, i.e., each DC reactor is charged once per cycle. Thus the inductance of each DC reactor L1 and L2 is set in the vicinity of ½ of that of the DC reactor 1.

When performing current limiting in the event of a fault, current flows as shown in FIGS. 2(b) and 3(b), and during charging of the DC reactors L1 and L2 or 1 by current limiting, current flows as shown in FIGS. 2(c) and 3(c).

Figure 4:
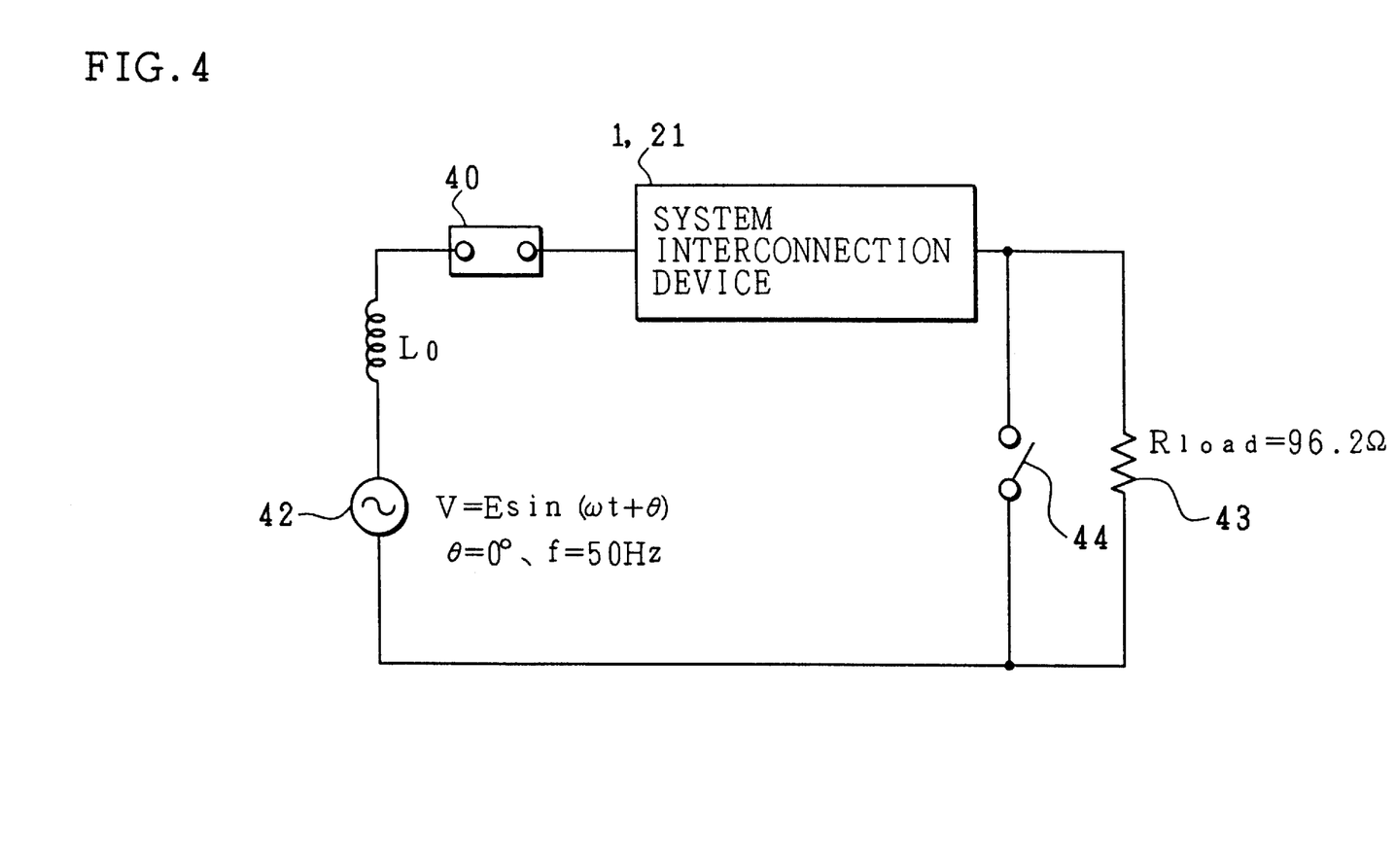
FIG. 4 is a block diagram of a simulation circuit of the system interconnection device shown in FIG. 1 and the conventional system interconnection device shown in FIG. 12.

FIG. 4 is a block diagram of a structure used to simulate the operations of the system interconnection device 21 structured as above and of the conventional system interconnection device 1. One of the AC terminals of the system interconnection device 21 or 1 is connected to a power source 42 via a switch 40, and the other AC terminal thereof is connected to a load 43. Further, a short-circuit switch 44 is connected in parallel with the load 43. A voltage produced by the power source 42 is $V=E\sin(\omega t+\theta)$, and its internal inductance $L_0$ is 0.0388 H. A system frequency f is 50 Hz. Further, a resistance value of the load 43 is set to 96.2Ω.

Parameters of the system interconnection devices 21 and 1 are as follows. Inductance of the DC reactor l is set to 0.9 H, while that of each of the DC reactors L1 and L2 is set to half of that, or 0.45 H. Further, internal resistance of each of the diodes d1 and d2, the thyristors th1 and th2, and the diodes D1 and D2, shown in FIGS. 2(d) and 3(d), is set to 0.05Ω.

Figure 5:
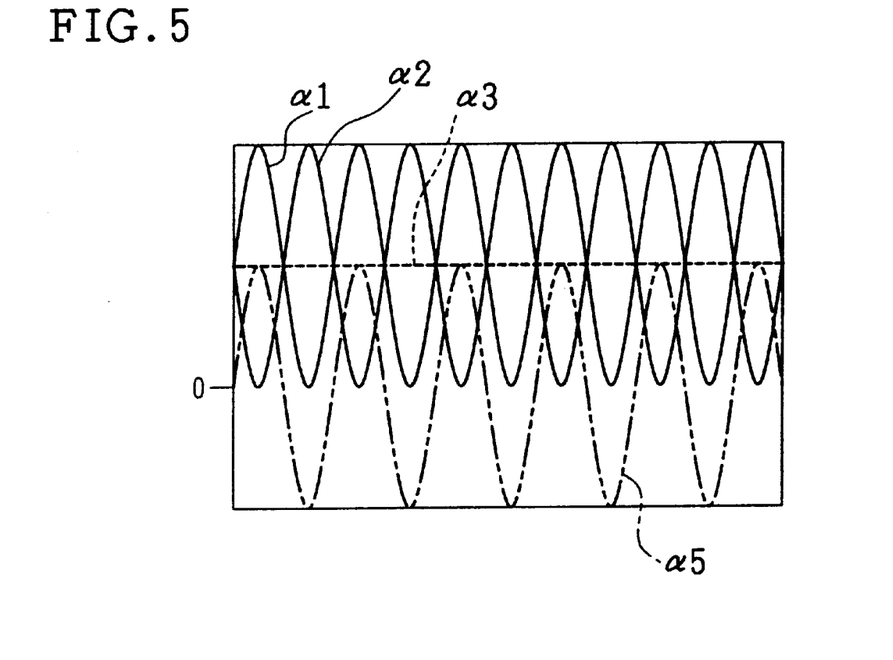
FIG. 5 is a wave-form diagram showing operations of the system interconnection device shown in FIG. 1 during normal operation.
Figure 6:
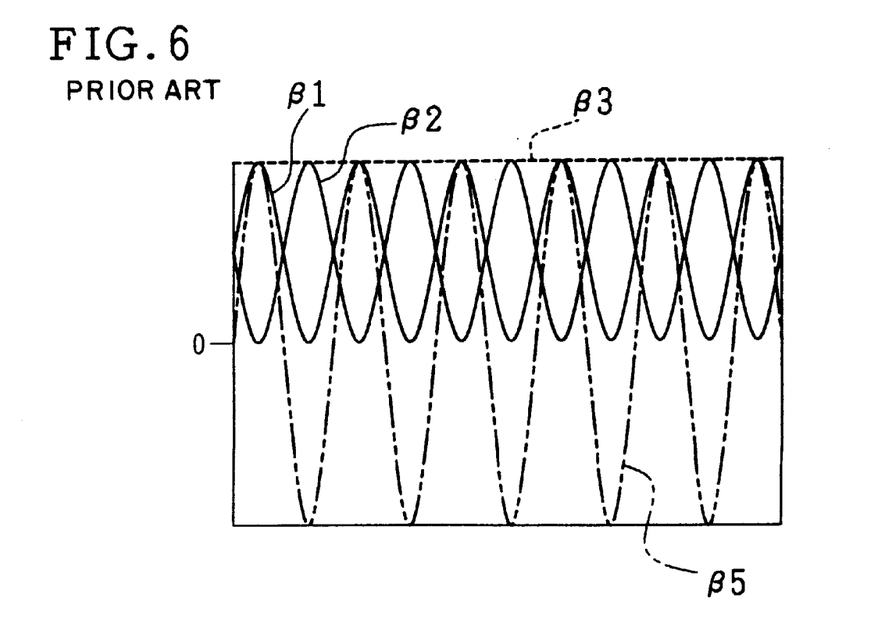
FIG. 6 is a wave-form diagram showing operations of the conventional system interconnection device shown in FIG. 12 during normal operation.
Figure 7:
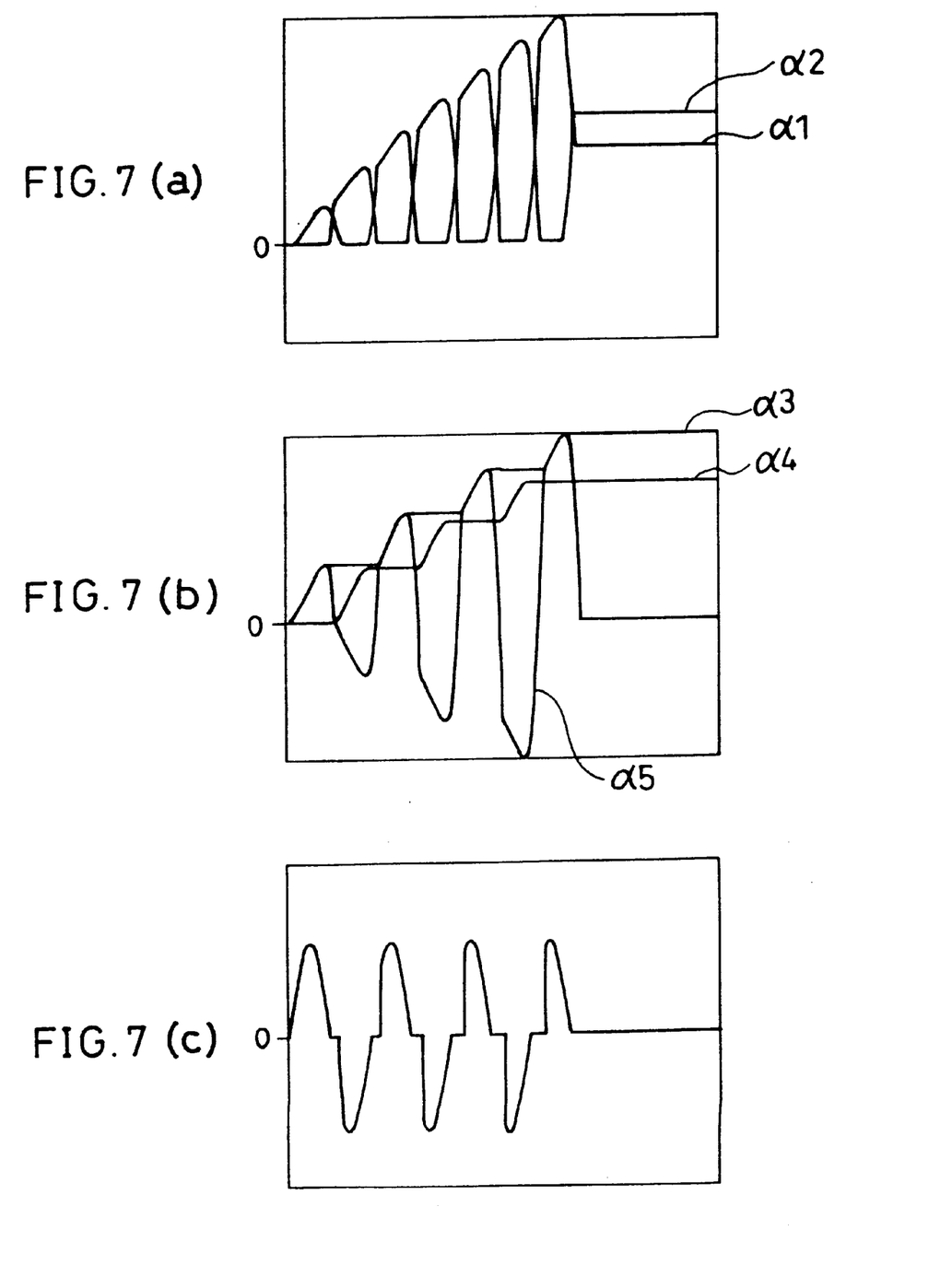
FIGS. 7(a) through 7(c) are wave-form diagrams showing operations of the system interconnection device shown in FIG. 1 when a fault occurs.

FIG. 5 is a wave-form diagram showing operations of the system interconnection device 21 during normal operation, and FIG. 6 is a wave-form diagram showing operations of the conventional system interconnection device 1 during normal operation. In FIG. 5, reference symbols α1 and α2 show the respective currents flowing through the diodes D1 and D2, reference symbol α3 shows current flowing through the DC reactors L1 and L2, and reference symbol α5 shows current flowing across the AC terminals AC1 and AC2. Similarly, in FIG. 6, reference symbol β1 shows current flowing through the diode d1 and the thyristor th2, reference symbol α2 shows current flowing through the diode d2 and the thyristor th1, reference symbol α3 shows current flowing through the DC reactor l, and reference symbol β5 shows current flowing across the AC terminals ac1 and ac2.

As is clear from a comparison of FIGS. 5 and 6, the current flowing through each of the diodes D1 and D2 is twice that flowing through each of the diodes d1 and d2 and the thyristors th1 and th2. Whereas the AC current flow in the conventional system interconnection device 1, as shown in FIG. 3(a), is divided between the upper and lower sides of the rectifying circuit, the AC current flow in the system interconnection device 21, as shown in FIG. 2(a), flows through the side formed by the diodes D1 and D2. The current flowing through the DC reactor l coincides with a peak value of the current flowing across the AC terminals ac1 and ac2, and, in the same way, the current flowing through the DC reactors L1 and L2 coincides with a peak value of the current flowing across the AC terminals AC1 and AC2.

Figure 8A:
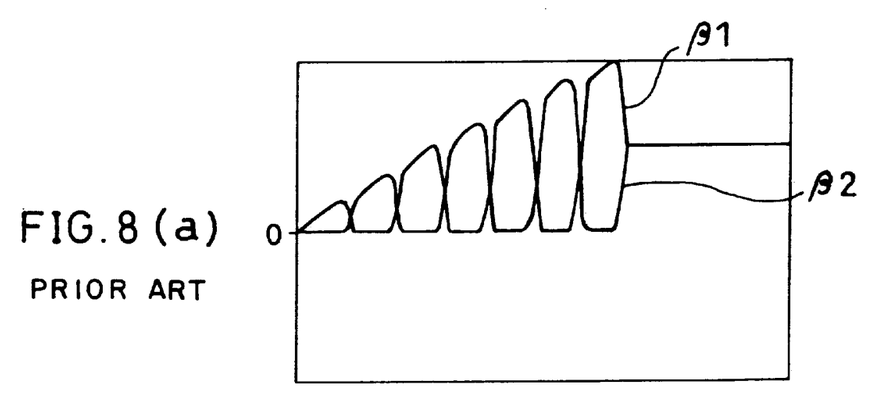
FIGS. 8(a) through 8(c) are wave-form diagrams showing operations of the conventional system interconnection device shown in FIG. 12 when a fault occurs.
Figure 8B:
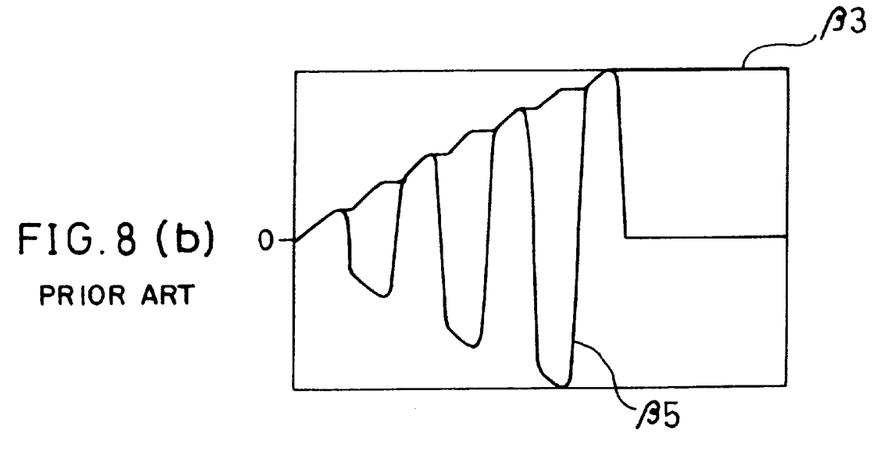
Figure 8C:
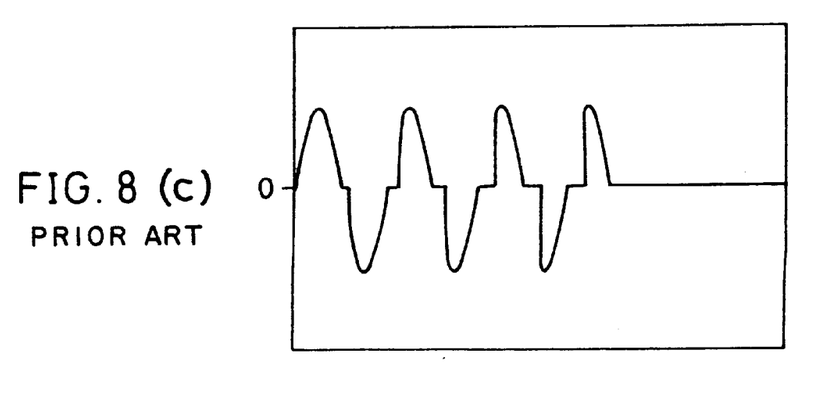

FIGS. 7(a) through 7(c) are wave-form diagrams showing operations of the system interconnection device 21 when a fault occurs, and FIGS. 8(a) through 8(c) are wave-form diagrams showing operations of the conventional system interconnection device 1 when a fault occurs. In the simulation structure shown in FIG. 4, occurrence of a fault was simulated by closing the short-circuit switch 44, and with a power source phase θ of 0° at the time of the fault, the switch 40 was disconnected at 3.5 cycles after occurrence of the fault.

In FIG. 7(a), reference symbols α1 and α2 show respective currents flowing through the diodes D1 and D2. In FIG. 7(b), reference symbols α3 and α4 show respective currents flowing through the DC reactors L1 and L2, and reference symbol α5 shows current flowing across the AC terminals AC1 and AC2. FIG. 7(c) shows voltage across the AC terminals AC1 and AC2. Further, in FIG. 8(a), reference symbol β1 shows current flowing through the diode d1 and the thyristor th2, and reference symbol β2 shows current flowing through the diode d2 and the thyristor th1. In FIG. 8(b), reference symbol β3 shows current flowing through the DC reactor l, and reference symbol β5 shows current flowing across the AC terminals ac1 and ac2. FIG. 8(c) shows voltage across the AC terminals ac1 and ac2.

As is clear from a comparison of FIGS. 7(a) through 7(c) with FIGS. 8(a) through 8(c), a current flowing through the DC reactors L1 and L2 or l (shown in FIGS. 2(b) and 3(b)) is an envelope of peak values of current across the AC terminals AC1 and AC2 or ac1 and ac2.

Further, in the conventional system interconnection device 1, as shown in FIG. 3(c), the DC reactor l is always charged regardless of the positive or negative direction of the alternating current, and thus the current flowing across the AC terminals ac1 and ac2 increases once every half-cycle. In the system interconnection device 21, in contrast, as shown in FIG. 2(c), since the DC reactors L1 and L2 are alternately charged depending on the positive or negative direction of the alternating current, the current flowing across the AC terminals AC1 and AC2 increases once every cycle. Further, in the conventional system interconnection device 1, as shown in FIG. 3(b), across the AC terminals ac1 and ac2, current flowing through the diode d1 and the thyristor th2 alternates with current flowing through the diode d2 and the thyristor th1 according to the positive or negative direction of the alternating current. In the system interconnection device 21, in contrast, as shown in FIG. 2(b), a direct current of the DC reactor corresponding to the diode through which current flows is added to the current flowing across the AC terminals AC1 and AC2, thus approximately doubling the current flow. Further, the voltages across the AC terminals AC1 and AC2 and the AC terminals ac1 and ac2 can be treated as approximately equal, and the voltage handled by each section can be treated as approximately equal.

In the system interconnection device 21, since, as discussed above, the DC reactors L1 and L2 are alternately charged according to the positive or negative direction of the alternating current, if disconnection is performed at a point (such as after 3.5 cycles) not in synchronization with an integer cycle, the respective quantities of current stored in the DC reactors L1 and L2 differ, and a difference arises in the current after disconnection, as shown by reference symbols α3 and α4 in FIG. 7(b). For this reason, in order to restrict to the same value the respective currents across the AC terminals AC1 and AC2 for each polarity of the alternating current, it is necessary to set the inductance of each of the DC reactors L1 and L2 to more than ½ of that of the DC reactor l.

The following will explain a method of calculating an inductance value of the DC reactors L1 and L2 necessary for current-limiting operations. When inductance is L and current is I, a magnetic field energy W stored in the DC reactors L1 and L2 is as shown by Equation (1) below.

$$W = \frac{1}{2} L \cdot I^2 \qquad (1)$$

Further, a time differential thereof is as shown in Equation (2).

$$\frac{dW}{dt} = I \cdot L \frac{dI}{dt} \qquad (2)$$

When V is a voltage across the AC terminals AC1 and AC2 during current-limiting operation, the following Equation (3) holds true.

$$V \approx L \frac{dI}{dt} \qquad (3)$$

Accordingly, increase in the quantity of magnetic field energy during current limiting is as shown in Equation (4).

$$\int dW = W' = \int V \cdot I \cdot dt = V \int I \cdot dt \qquad (4)$$

In Equation (4) above, on the right side, the voltage V across the terminals decreases with time, but in the case of current limiting over a short time such as several cycles, the voltage V across the terminals can be treated as effectively fixed, and, ignoring impedance of the system, the voltage V across the terminals corresponds to the voltage of the power source. Further, since, as discussed above, the integral of the current I on the right side of Equation (4) substantially corresponds to a time integral of the current across the AC terminals AC1 and AC2 during current limiting, it can be treated as an average quantity of current limiting over time of the system interconnecting device 21. Accordingly, if the respective quantities of increase of magnetic field energy W' of the DC reactors L1 and L2 are equal, then their current limiting quantities can also be treated as approximately equal.

Accordingly, when the respective quantities of increase of magnetic field energy of the DC reactors L1 and L2 are equal, i.e., when respective currents flowing through the DC reactors L1 and L2 are equal and disconnection is performed in synchronization with an integer cycle, then the inductance of each DC reactor L1 and L2 can be reduced to ½ of that of the DC reactor l. However, if disconnection is performed at a point (such as after 3.5 cycles) not in synchronization with an integer cycle, the DC reactors L1 and L2 have different respective magnetic field energies, and, as discussed above, it is necessary to set the inductance of each DC reactor L1 and L2 to more than ½ of that of the DC reactor l. For example, if disconnection is performed after 3.5 cycles, it is necessary to set the respective inductances so that L1=L2=0.5 H, or 1.11 times (0.5/0.45) that in the case of disconnection at an integer cycle.

Further, after disconnection by the circuit-breaker 31, due to discharge of the magnetic field energy stored in the DC reactors L1 and L2, current returns through each of the unit parallel circuits U1 and U2. However, if the circuit-breaker 31 is disconnected due to occurrence of a fault, in order to detect the faulty point, three circuit-breakers, for example, above the circuit-breaker 31 which was cut off are temporarily disconnected, and then re-connected in reverse order. Accordingly, at the time of re-connection, the above-mentioned returning current must have attenuated to a level which allows re-connection. When the DC reactors L1 and L2 have an inductance of L and an internal resistance of R, the current attenuation time constant $\tau$ can be calculated as L/R, if internal resistance of the diodes D1 and D2 is ignored. Accordingly, the current attenuation time constant $\tau$ is not less than 2.5 times the system frequency cycle, and its maximum value can be calculated as follows.

In order to re-connect the circuit-breaker 31, the maximum current $I_{DCMAX}$ at the time of current limiting by the DC reactors L1 and L2 must have attenuated to the level of the current $I_{DC0}$ during normal operation, and, when $T_0$ is a disconnect/connect interval required for re-connection of the systems, the following relationship must be fulfilled.

$$I_{DC0} \geq I_{DCMAX} \cdot \exp(-T_0/\tau) \quad (5)$$

Accordingly, $\tau$ is set according to the following.

$$\tau \leq T_0/\ln(I_{DCMAX}/I_{DC0}) \quad (6)$$

In this way, after disconnection, by re-connecting the circuit-breaker 31 after passage of the disconnect/connect interval $T_0$, the systems can be rapidly re-connected.

The foregoing disconnect/connect interval $T_0$, the current $I_{DC0}$ during normal operation, and the maximum current $I_{DCMAX}$ during current limiting differ according to the type of systems the system interconnection device 21 is applied to, but with a typical high-voltage system, for example, $T_0=1$ sec, and $I_{DCMAX}/I_{DC0}=10$. Accordingly, in this case, from Equation (6) above, $\tau \leq 0.4334$ sec. Here, if, for example, L=10 mH, then it is sufficient if $R \geq 0.023\Omega$. In this way, disconnection and re-connection operations can be performed at a disconnect/connect interval $T_0$ required in a system interconnection device.

As discussed above, in order to realize a current-limiting effect equivalent to that of the conventional system interconnection device 1, the system interconnection device 21 according to the present invention requires two DC reactors L1 and L2 with a total inductance approximately equal to that of the DC reactor l, and requires that each of the diodes D1 and D2 have approximately double the current capacity, but the number of rectifying elements can be reduced, thus reducing the cost of the rectifying elements, and also greatly reducing the cost and space devoted to insulation for the rectifying elements.

Incidentally, the diodes D1 and D2 may be replaced by thyristors operating as diodes. In this case, since thyristors have a higher withstand voltage per element, fewer serial stages of elements are necessary to obtain a desired withstand voltage. Accordingly, such a structure is especially advantageous with high-voltage or special high-voltage systems.

Further, in the conventional system interconnection device 1, current ceases flowing through the diodes d1 and d2 and the thyristors th1 and th2 once every half-cycle, thus enabling the thyristors th1 and th2 to disconnect the two systems. However, in the present system interconnection device 21, the current flowing through the diodes D1 and D2 is the foregoing DC component added to an AC component. Thus, even if the diodes D1 and D2 are replaced by thyristors as above, system disconnection is difficult, thus making this structure especially suitable for high-voltage or special high-voltage systems which require use of the circuit-breaker 31.

Second Embodiment

Figure 9:
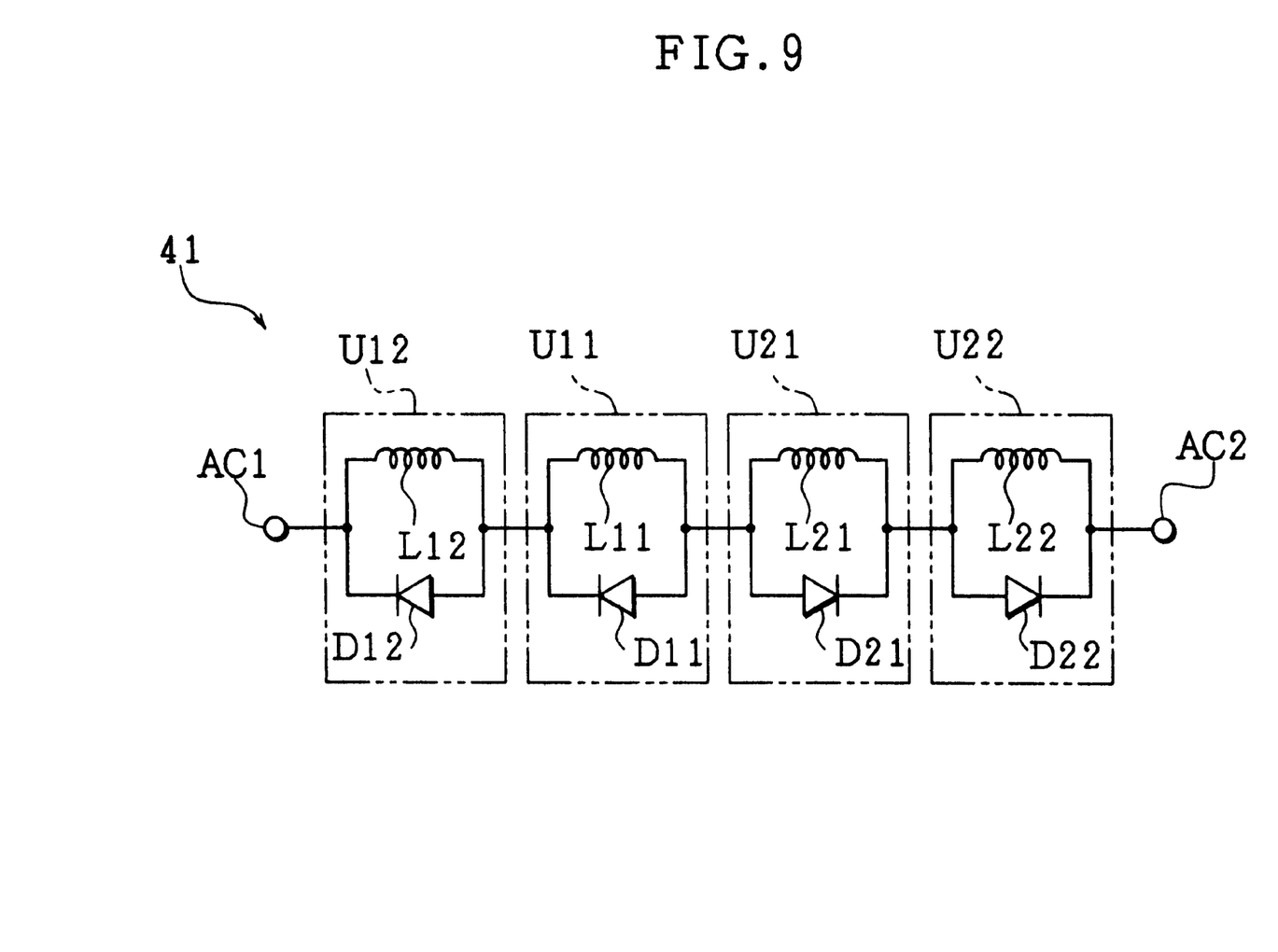
FIG. 9 is an electric circuit diagram showing the structure of part of a system interconnection device according to the second embodiment of the present invention.

The following will explain a second embodiment of the present invention with reference to FIG. 9.

FIG. 9 is an electric circuit diagram showing the structure of part of a system interconnection device 41 according to the present second embodiment. In the system interconnection device 41, diodes D11, D12, D21, and D22, corresponding to a rated voltage set in advance, and DC reactors L11, L12, L21, and L22, corresponding to a current-limiting time constant, make up equivalent unit parallel circuits U11, U12, U21, and U22, respectively.

In the system interconnection device 41, if L is an inductance required for a current-limiting effect, N is a number of stages of unit parallel circuits in each diode direction, and Lu is the inductance of each unit parallel circuit, N can be calculated as follows.

$$N=(L/2)/Lu (\text{round up}) \quad (7)$$

The system interconnection device 41 is designed with a total of 2N unit parallel circuits.

Accordingly, a system interconnection device can be easily designed by setting a standard for the unit parallel circuits, and then calculating the total number of unit parallel circuits 2N according to Equation (7) above, in conformity with the specifications of the systems with which the device is to be used.

Incidentally, unit parallel circuits with diodes having the same direction need not be provided adjacent to each other, and accordingly, the system interconnection device 41 shown in FIG. 9 may be structured so that the position of the unit parallel circuit U11 is exchanged with that of the unit parallel circuit U21 or U22. Further, since the maximum voltages applied to the diodes D11, D12, D21, and D22 of the unit parallel circuits U11, U12, U21, and U22 are equalized by the DC reactors L11, L12, L21, and L22 of equal inductance, unevenness in characteristics among the unit parallel circuits due to diode characteristics is not a problem.

Third Embodiment

Figure 10:
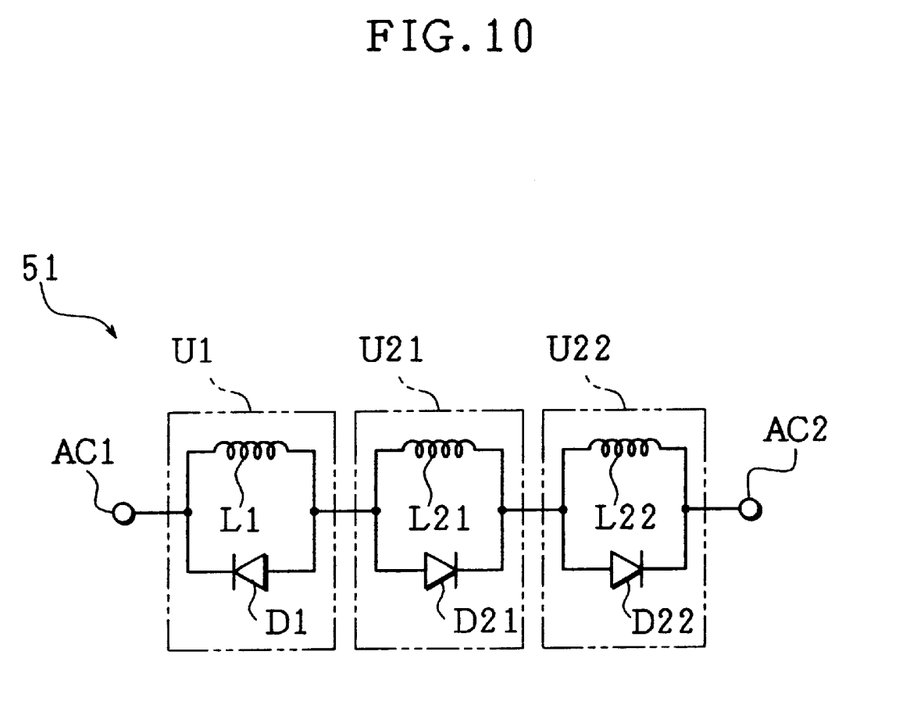
FIG. 10 is an electric circuit diagram showing the structure of part of a system interconnection device according to the third embodiment of the present invention.

The following will explain a third embodiment of the present invention with reference to FIG. 10.

FIG. 10 is an electric circuit diagram showing the structure of part of a system interconnection device 51 according to the present third embodiment. The system interconnection device is an example in which the number of unit parallel circuits having diodes of positive direction differs from the number having diodes of the negative direction. In other words, a single unit parallel circuit U1 including a diode D1 of positive direction and a DC reactor L1 is serially connected to two unit parallel circuits U21 and U22 including diodes of negative direction D21 and D22 and DC reactors L21 and L22. In this case, the inductance between each unit parallel circuit is set so as to satisfy the following.

$$L1 = L21 + L22 \tag{8}$$

Fourth Embodiment

Figure 11:
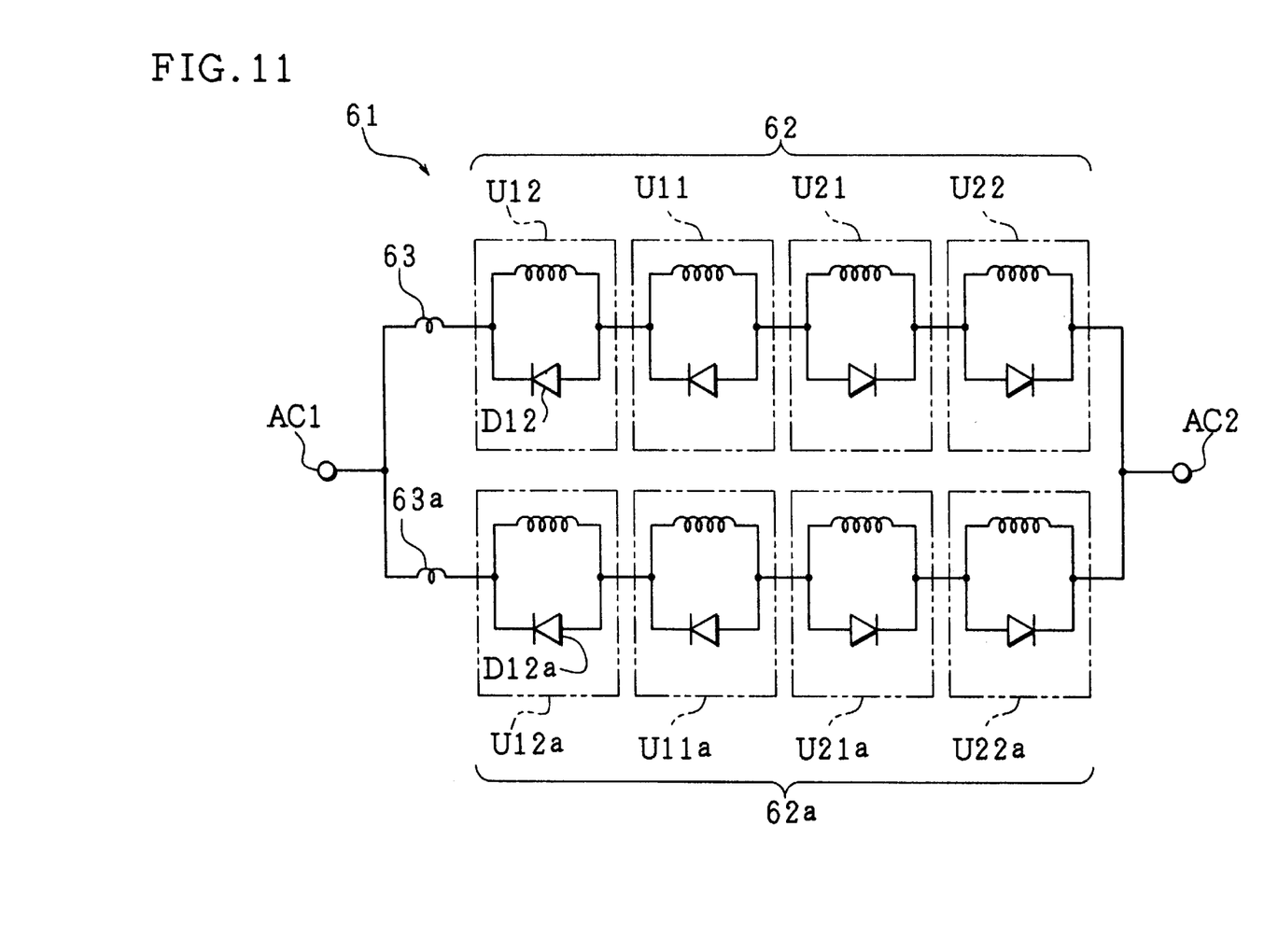
FIG. 11 is an electric circuit diagram showing the structure of part of a system interconnection device according to the fourth embodiment of the present invention.

The following will explain a fourth embodiment of the present invention with reference to FIG. 11.

FIG. 11 is an electric circuit diagram showing the structure of part of a system interconnection device 61 according to the present fourth embodiment. In the system interconnection device 61, a serial circuit 62, made up of unit parallel circuits U11, U12, U21, and U22 connected in series, is connected in parallel with a serial circuit 62a, made up of unit parallel circuits U11a, U12a, U21a, and U22a. In this way, the system interconnection device 61 is structured so as to correspond to a desired rated current. Further, an AC reactor for equalizing current is provided at one or both ends of at least one of the serial circuits (in the example shown in FIG. 11, the ends of each serial circuit 62 and 62a toward the AC terminal AC1 are provided with AC reactors 63 and 63a).

In each serial circuit 62 and 62a, the number of unit stages in each diode direction is calculated according to Equation (7) above. Since inductances of the DC reactors L11, L12, L21, and L22 take effect during current limiting, it is sufficient if the AC reactors 63 and 63a are able to equalize the current flowing through the device during normal operation. Accordingly, when a number of serial circuit stages connected in parallel is M, and current flowing through the device during normal operation (peak value) is I, then a current i flowing through each diode of the serial circuit can be calculated as shown below.

$$i = I/M + (I/M) \sin(\omega t) \tag{9}$$

If the total voltage reduction in the direction of the diodes due to the current i is calculated for each serial circuit, and Vmax is a maximum value among the totals for the various serial circuits, then inductance Le of the AC reactors is set to satisfy the following.

$$\omega Le > Vmax \tag{10}$$

In this way, by setting the inductance of the AC reactors as necessary, even if the very small internal impedance of each serial circuit 62 and 62a during normal operation differ from one another, this difference can effectively be ignored, thus simplifying design and production. Further, by providing the serial circuits with corresponding unit parallel circuits, such as the unit parallel circuits U12 and U12a, a potential difference between the corresponding unit parallel circuits U12 and U12a is reduced to a very small voltage, in the vicinity of the unevenness in characteristics between the diodes D12 and D12a, thus enabling the structure for insulation to be greatly simplified.

Incidentally, three or more serial circuits may of course be connected in parallel.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations, provided such variations do not depart from the spirit of the present invention or exceed the scope of the patent claims set forth below.

What is claimed is:

1. A system interconnection device for connecting two systems, comprising:
    unit parallel circuits, each including a rectifying element and a direct-current reactor connected in parallel;
    a serial circuit including a plurality of said unit parallel circuits serially connected such that total inductances of said direct-current reactors in positive and negative rectifying directions of said rectifying elements are substantially equal; and
    a circuit-breaker for connecting and disconnecting the two systems, wherein:
        said circuit-breaker and said serial circuit are interposed between the two systems; and
        a current attenuation time constant τ of said direct-current reactors is set according to the formula:

$$\tau \leq T_0 / \ln(I_{DCMAX}/I_{DC0})$$

wherein $I_{DC0}$ is a current flowing through said direct-current reactors during normal operation, $I_{DCMAX}$ is a maximum current during a current-limiting effect, and $T_0$ is a disconnect/connect interval of said circuit-breaker, required for re-connection of the two systems.

2. The system interconnection device according to claim 1, wherein:
    a plurality of said serial circuits are provided; and
    said serial circuits are mutually connected in parallel.

3. The system interconnection device set forth in claim 2, wherein:
    one or both ends of at least one of said plurality of serial circuits is provided with an alternating-current reactor for equalizing current.

4. A method of designing a system interconnection device comprising:
    unit parallel circuits, each including a rectifying element and a direct-current reactor connected in parallel;
    a serial circuit including a plurality of said unit parallel circuits serially connected such that total inductances of said direct-current reactors in positive and negative rectifying directions of said rectifying elements are substantially equal; and
    a circuit-breaker for connecting and disconnecting the two systems, wherein:
        said circuit-breaker and said serial circuit are interposed between the two systems; and a current attenuation time constant τ of said direct-current reactors is set according to the formula:

$$\tau \leq T_0/\ln(I_{DCMAX}/I_{DC0})$$

wherein $I_{DC0}$ is a current flowing through said direct-current reactors during normal operation, $I_{DCMAX}$ is a maximum current during a current-limiting effect, and $T_0$ is a disconnect/connect interval of said circuit-breaker, required for re-connection of the two systems; said method comprising the steps of:

setting in advance a rated voltage and a rated current of said unit parallel circuits;

setting a number of stages of said unit parallel circuits to be serially connected so as to be able to handle a voltage at least as large as the desired rated voltage;

and setting a number of said serial circuits to be connected in parallel so as to be able to handle a current at least as large as the desired rated current.

* * * * *